United States Patent
Popov et al.

(10) Patent No.: US 11,588,429 B2
(45) Date of Patent: Feb. 21, 2023

(54) SYSTEM AND METHOD FOR MOTOR CONTROL THROUGH DYNAMIC SELECTIVE COIL MEASUREMENT

(71) Applicant: Insight Automation, Erlanger, KY (US)

(72) Inventors: Emil V. Popov, Independence, KY (US); Ivaylo N. Sotirov, Mason, OH (US)

(73) Assignee: Insight Automation, Inc., Erlanger, KY (US)

( * ) Notice: Subject to any disclaimer, the term of this patent is extended or adjusted under 35 U.S.C. 154(b) by 0 days.

(21) Appl. No.: 17/084,093

(22) Filed: Oct. 29, 2020

(65) Prior Publication Data

US 2022/0140765 A1    May 5, 2022

(51) Int. Cl.
*H02P 27/08* (2006.01)
*H02P 23/14* (2006.01)

(52) U.S. Cl.
CPC ............. *H02P 27/08* (2013.01); *H02P 23/14* (2013.01)

(58) Field of Classification Search
CPC .......... H02P 21/00; H02P 21/08; H02P 21/10; H02P 21/14; H02P 21/22; H02P 23/00; H02P 23/07; H02P 23/14; H02P 23/18; H02P 27/00; H02P 27/04; H02P 27/06; H02P 27/08; H02P 27/085; H02P 1/00; H02P 1/04; H02P 1/16; H02P 1/46; H02P 1/42; H02P 1/465; H02P 6/00; H02P 6/007; H02P 6/28; H02P 7/04; H02P 7/29
See application file for complete search history.

(56) References Cited

U.S. PATENT DOCUMENTS

| | | | |
|---|---|---|---|
| 4,724,373 A | | 2/1988 | Lipo |
| 4,961,038 A | * | 10/1990 | MacMinn ............. H02P 25/098 318/685 |

(Continued)

OTHER PUBLICATIONS

U.S. Patent and Trademark Office; Search Report and Written Opinion in related International Patent Application No. PCT/US2021/57356 dated Jan. 31, 2022; 12 pages.

*Primary Examiner* — Antony M Paul
(74) *Attorney, Agent, or Firm* — Wood Herron & Evans LLP

(57) ABSTRACT

A motor control system for controlling a motor having multiple coils, includes a motor control circuit for providing control signals for controlling a motor, such as PWM signals. A motor drive circuit is coupled to receive the control signals and is configured for providing current drive signals to the multiple coils of the motor. Circuitry measures a plurality of signal values that are reflective of the level of the current drive signals provided to the multiple coils of the motor. Selection circuitry coupled to receive the measured current signal values is configured to dynamically select certain current signal values from the measured plurality of signal values and is further configured to exclude at least one of the current signal values that is indicative of a possibly erroneous or unreliable value. Calculation circuitry is configured to use the selected signal values to calculate a value for the excluded current signal value and the motor control circuit uses the measured and calculated current signal values for providing the control signals for a motor.

16 Claims, 7 Drawing Sheets

(56) References Cited

U.S. PATENT DOCUMENTS

| | | | |
|---|---|---|---|
| 5,619,114 A * | 4/1997 | Blasko | H02P 23/16 318/802 |
| 5,990,640 A * | 11/1999 | Dwyer | H02P 7/04 318/245 |
| 5,990,643 A | 11/1999 | Holling et al. | |
| 6,515,446 B1 * | 2/2003 | Koide | B60L 50/61 318/700 |
| 6,703,805 B2 | 3/2004 | Griffitts | |
| 6,784,634 B2 * | 8/2004 | Sweo | H02P 9/007 290/46 |
| 7,026,782 B2 | 4/2006 | Aoki et al. | |
| 7,112,933 B1 | 9/2006 | Ueda et al. | |
| 7,750,586 B2 | 7/2010 | Kurosawa et al. | |
| 8,350,507 B2 | 1/2013 | Ito et al. | |
| 8,508,174 B2 * | 8/2013 | Haas | H02P 1/04 318/599 |
| 8,760,030 B2 * | 6/2014 | Ross | H02K 41/06 310/261.1 |
| 8,791,715 B2 | 7/2014 | Abel et al. | |
| 9,413,281 B2 * | 8/2016 | Nakai | B60L 15/2009 |
| 9,692,346 B2 * | 6/2017 | Nakai | H02P 21/14 |
| 9,705,445 B2 * | 7/2017 | Fujishima | H02P 21/13 |
| 9,874,461 B2 | 1/2018 | Ishida et al. | |
| 2005/0189892 A1 | 9/2005 | Kokami et al. | |
| 2013/0207588 A1 | 8/2013 | Lee et al. | |
| 2014/0333241 A1 | 11/2014 | Zhao et al. | |
| 2015/0288305 A1 | 10/2015 | Mendoza | |
| 2016/0211791 A1 | 7/2016 | Green et al. | |
| 2017/0077946 A1 | 3/2017 | Christen et al. | |
| 2017/0126153 A1 | 5/2017 | Lepka et al. | |
| 2020/0295689 A1 * | 9/2020 | Tachibana | H02P 27/12 |

\* cited by examiner

SYSTEM AND METHOD FOR MOTOR CONTROL THROUGH DYNAMIC SELECTIVE COIL MEASUREMENT

FIELD OF THE INVENTION

The invention is directed generally to the control of motors and specifically to the precise control of motors, such as DC motors and multi-phase motors.

BACKGROUND OF THE INVENTION

In the area of motor control, and particularly precise motor control, such as for DC and multi-phase motors, it is critical for the motor driver circuitry to be able to to measure the current passing through the coils of the motor. There are various different solutions available that might be utilized for such measurements and controls, but each has various drawbacks and costs.

For example, current transducers or transformers might be used. Two or three transducers might be implemented into a control scheme. However, such transducers/transformers are often bulky and occupy significant space with respect to the motor. Furthermore, they are more expensive than other solutions.

For a cost-effective solution, current shunts are also used due to the lower cost of such hardware. As such, various different designs focus on measuring coil currents by placing a shunt resistor in the ground connected path of a transistor half-bridge circuit that is used for motor control. Such systems utilize center-aligned pulse width modulation (PWM) for convenience. However, as discussed further hereinbelow, the use of shuts also has some drawbacks. For example, you have a limited time window for measuring the current since the shunts provide the desirable coil current signal during the conduction through the lower half of the half-bridge circuit. Also, due to current settling time and the variation in the current through the coil over time, the center point of the PWM cycle is the desirable point to measure the current. With PWM cycles approaching 100%, the current measurement window in the lower half of the half-bridge circuit is very short and if the measurement is dominated by ringing and noise in the window, the measurement is of little value.

As a result, some solutions using current shunts is to use current shunts to measure two currents and to limit the maximum PWM value to about 90% in order to avoid settling time problem. This approach results in the inability of the motor driver to output the full DC bus voltage and thus it limits the motor's torque capability when approaching or exceeding the motor's rated speed.

Another solution using current shunts involves the measurement of all three currents through the current shunts. Then, the noisiest current measurement is excluded. Using the two measured signals, the third signal is then reconstructed using Kirchoff's law: Current_U+Current_V+Current_W=0. This approach allows for the use of 100% PWM values. However, such a solution suffers from drawbacks based on the fact that it is difficult and somewhat expensive to find analog-to-digital (ADC) hardware that can sample all of the three currents concurrently.

Accordingly, there is still a need for an efficient and cost effective way to provide current measurement in a dynamic control of a DC or multi-phase motor, such as brushless DC motor (BLDC) or a permanent magnet synchronous motor (PMSM). There is further a need to provide a solution using available hardware that is not overly bulky or expensive and is able to provide a consistent measurement for motor control.

SUMMARY OF THE INVENTION

A motor control system for controlling a motor having multiple coils, includes a motor control circuit for providing control signals for controlling a motor, such as PWM signals. A motor drive circuit is coupled to receive the control signals and is configured for providing current drive signals to the multiple coils of the motor. Circuitry measures a plurality of signal values that are reflective of the level of the current drive signals that are provided to the multiple coils of the motor. Selection circuitry, coupled to receive the measured current signal values is configured to dynamically select certain signal values from the measured plurality of signal values and is further configured to exclude at least one of the current signal values that is indicative of a possibly erroneous or unreliable current value. Calculation circuitry is configured to use the selected signal values to calculate a current signal value for the excluded current signal value and the motor control circuit uses the measured and calculated current signal values for providing the control signals for a motor.

In on embodiment the dynamic selection is based upon evaluation of the control signals of the motor control circuit, such as PWM signals. With a drive circuit using transistors for driving the motor coils, the current signal associated with the transistor that is ON the shortest length of time is excluded. Depending on the current measurements that are made, the measured current associated with a transistor driven by the highest or lowest PWM signal is excluded and then subsequently calculated. Alternatively, the dynamic selection is based upon evaluation of the angle of the rotor of the motor being controlled.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
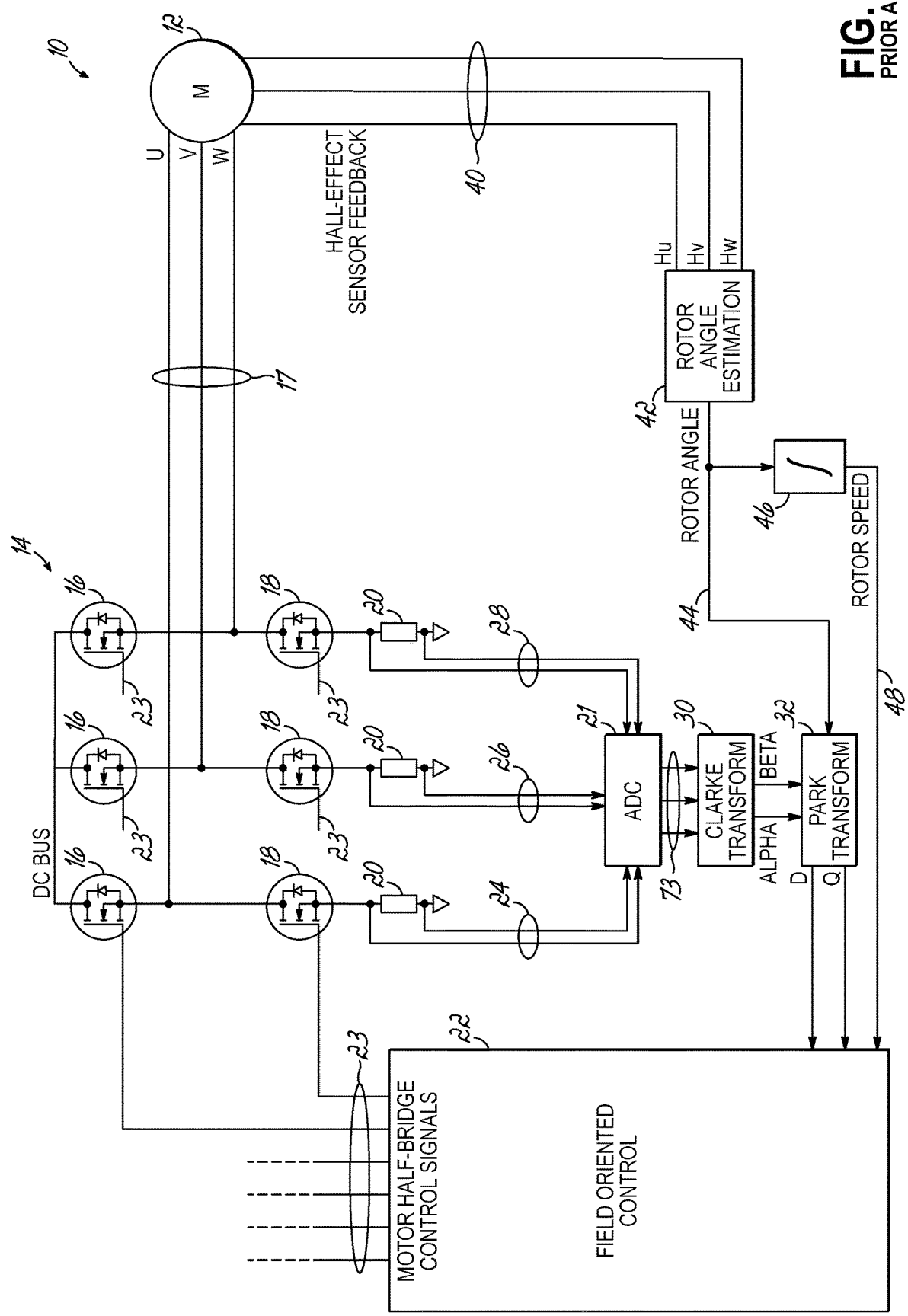
FIG. 1 is a circuit diagram of a motor control circuit system that provides a conventional measurement of motor currents through three coils of a motor for use in the control scheme.

In precise motor control (DC and multi-phase motors) it is vital for motor driver circuitry to be able to determine and/or measure the current through the coils of the motor. As discussed herein, there are various ways to measure those currents. FIG. 1 illustrates one version of a typical motor control system 10 for control of a motor. The system 10 includes a number of interconnected circuits for controlling the operation of the motor 12 and specifically uses a motor drive circuit 14 that receives control signals 23 from a motor control circuit 22. The motor can be an appropriate multi-phase motor, such as, for example brushless DC motors (BLDC) or permanent magnet synchronous motors (PMSM) or AC asynchronous motors or Reluctance motors, to name a few. The motor drive circuit 14 in one embodiment is in the form of a half-bridge circuit that incorporates transistors 16 in an upper half of the drive circuit 14 and transistors 18 in a lower half of the drive circuit that are selectively powered to conduct in cycles for the creation of current drive signals 17 for the various motor coils for proper commutation of the motor. Generally, in the operation of the illustrated drive circuit 14, it will be controlled through pulse width modulation (PWM) control signals 23 sent to the various transistors 16, 18 to provide the desired U, V, W phase current drive signals 17 to motor 12. For the necessary control and proper commutation of the motor, it is important to know the level of the current drive signals 17 that are directed to the various coils at certain times as well as the rotor angle of the rotor element of the motor.

For the measurement of current levels in the various coils of the motor 12, different currents might be measured that are reflective of or associated with the level of current directed to the individual coils. In the embodiment illustrated in FIG. 4, the motor drive circuit 14 uses low side or ground side shunt resistors 20 that are connected with the output of the lower half transistors 18 to ground. The transistors 16 and 18 are controlled by the motor control circuit 22, such as a field oriented control circuit. The control circuit 22 receives a number of inputs that reflect conditions of the motor operation, such as the measurements of the coil current from the shunt resistors 20, as transformed for control purposes, and other inputs, such as the rotor speed 48 of the motor 12 or the rotor angle 44. The control circuit 22 processes the various inputs and generates outputs, such as control signals 23 for operating the drive circuit 14 and the various transistors 16, 18.

More specifically, as illustrated in FIG. 1, the current of the drive signals 17 to the motor coils is measured by measuring an effective current in each branch containing the lower half transistors 18 that provide the drive signals 17. The measured current values 24, 26, 28 are reflective of the current drive signals 17 being directed as drive signals in the U, V and W phase paths for the coils and may be obtained by measuring voltages across the shunt resistors 20 through lines 24, 26, 28 for coils U, V, and W, respectively, of the motor 12. The measured voltages are directed to an ADC circuit 21 for transformation to appropriate current measurements that are then digitized for use as inputs for the control circuit 22 as noted herein. In one embodiment of the invention, as illustrated in the Figures, a Clarke transformation circuit 30 is used to convert the time domain signals 24, 26, 28 into an alpha/beta representation or frame as is known in the field of motor control. A Park transformation circuit then converts the two components in the alpha/beta frame to an orthogonal rotating reference frame (dq). Implementing these two transforms in a consecutive manner simplifies computations by converting AC current and voltage waveform into DC signals as known to a person of ordinary skill in the art of motor control.

Motor 12 also incorporates a plurality of Hall-effect sensors for providing sensor feedback signals 40 illustrated as Hu, Hv, Hw that are fed to an angle estimation circuit 42 for calculating the rotor angle 44 of the motor 12 according to known methods. The rotor angle output 44 is provided to the Park transformation circuit 32 and can be used by circuit 46 for determining rotor speed 48 in accordance with known methods. The rotor speed input 48 is also used by the field oriented control circuit 22 for providing the motor control signals 23 to the drive circuit. As illustrated, the control signals 23 operate the on/off cycles of the various banks of upper and lower transistors 16, 18 of the drive circuit 14 to provide the current drive signals 17 for the coils, indicated at U, V, W, as is conventional for the coils of the motor 12 for proper motor commutation.

Referring to FIG. 1, the control circuit 22 has access to measurements of the coil currents by monitoring the voltage measurement signals 24, 26, 28 across resistors 20 when the low half transistors 18 of the drive circuit 14 are conducting current through the shunt resistors 20. At that time of conduction through lower half transistors 18, the coil current is flowing through the current sensing resistors 20. While the lower half transistors 18 are turned OFF, there is no current flowing in the shunt resistors 20 and the measured current signal is not available. The ADC component 21 has outputs reflective of a zero Amps reading. As the lower transistors 18 turn ON and are driven by pulse width modulation (PWM) control signals 23, current passes through the shunt resistors 20 and a ringing waveform current signal U, V, W results and lasts a measurable amount of time before the respective signal settles to an instantaneous value. This time is referred to as a "settling time" for the transistor.

Figure 2:
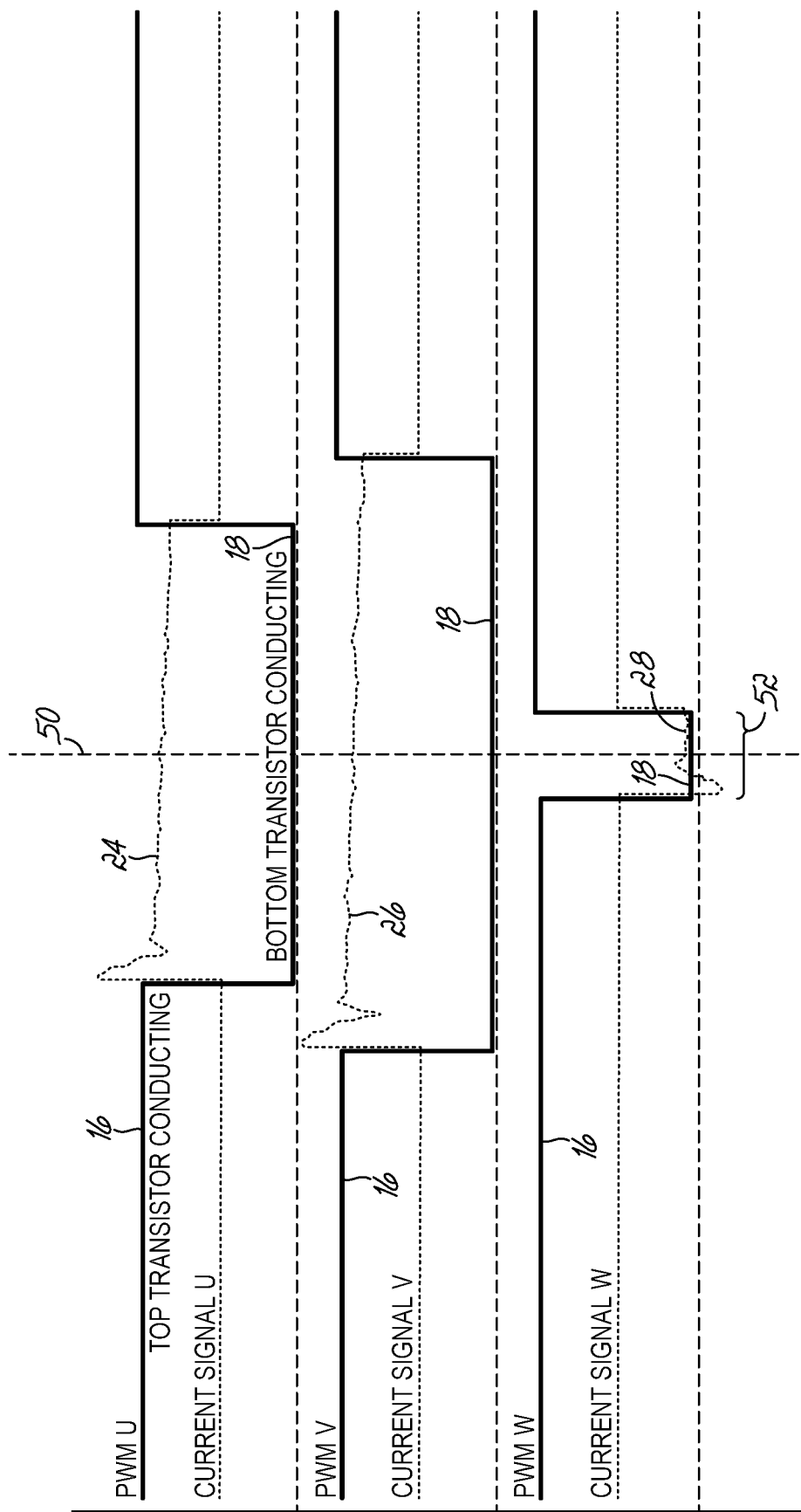
FIG. 2 is a chart showing the current measurements for the three phases of a controlled motor as measured in a half-bridge circuit arrangement as illustrated in FIG. 1.

FIG. 2 illustrates a graphic of the cyclical operation of the top and bottom transistors of the exemplary motor control signals U, V, W over time as provided and the current measurements reflective of the measured voltages 24, 26, 28 (FIG. 1). The FIG. 2 illustrates the actual current signals (also illustrated as numerals 24, 26, 28) through the various branch shunt resistors 20 from the alternating ON and OFF periods of the upper or top transistors 16 and lower or bottom transistors 18. FIG. 2 reflects a combination and indication of both of the top and bottom transistor conduction times. The ringing current signals 24, 26, 28 illustrate that during the lower transistor ON time, the current through the coils is not constant. Rather, it changes at a constant and fairly slow rate. This is normal and is indicative of the current ripple through the motor coils. This current ripple is a natural consequence of driving an inductive load with a PWM signal. The average value of the current signal (within the ripple amplitude) happens generally in the middle of the lower transistor conduction time. Since the motor control circuit 22 uses that average value, the center point of the PWM cycle as illustrated by reference numeral 50 in FIG. 2 is the ideal time to sample the current signal for motor control.

The current measurement and control scheme as illustrated in FIG. 1 has certain drawbacks however, as discussed above. At PWM duty cycles for a particular phase approaching 100%, which percentages are indicative of the top transistor for a particular phase conducting for the longest time (as is the depicted case for phase current W in FIG. 2), the bottom transistor, in turn, is conducting for the shortest amount of time. Therefore, if measurements are being made across the shunt resistors 20 associated with bottom transistors 18, the current measurement window 52 is also very short. This can be seen in FIG. 2 for the W phase signal. In fact, the size of the short measurement window may be comparable to the settling time of the actual current signal as depicted by 28 in FIG. 2. If the current signal has not settled by the time the ADC circuitry begins the sampling of the shunt resistor current measurement signals 24, 26, 28, the resulting measurement is dominated by ringing and random noise for one of the particular phase measurements. This will make the measurement value for that phase of little use, since it no longer represents the actual coil current.

Figure 3:
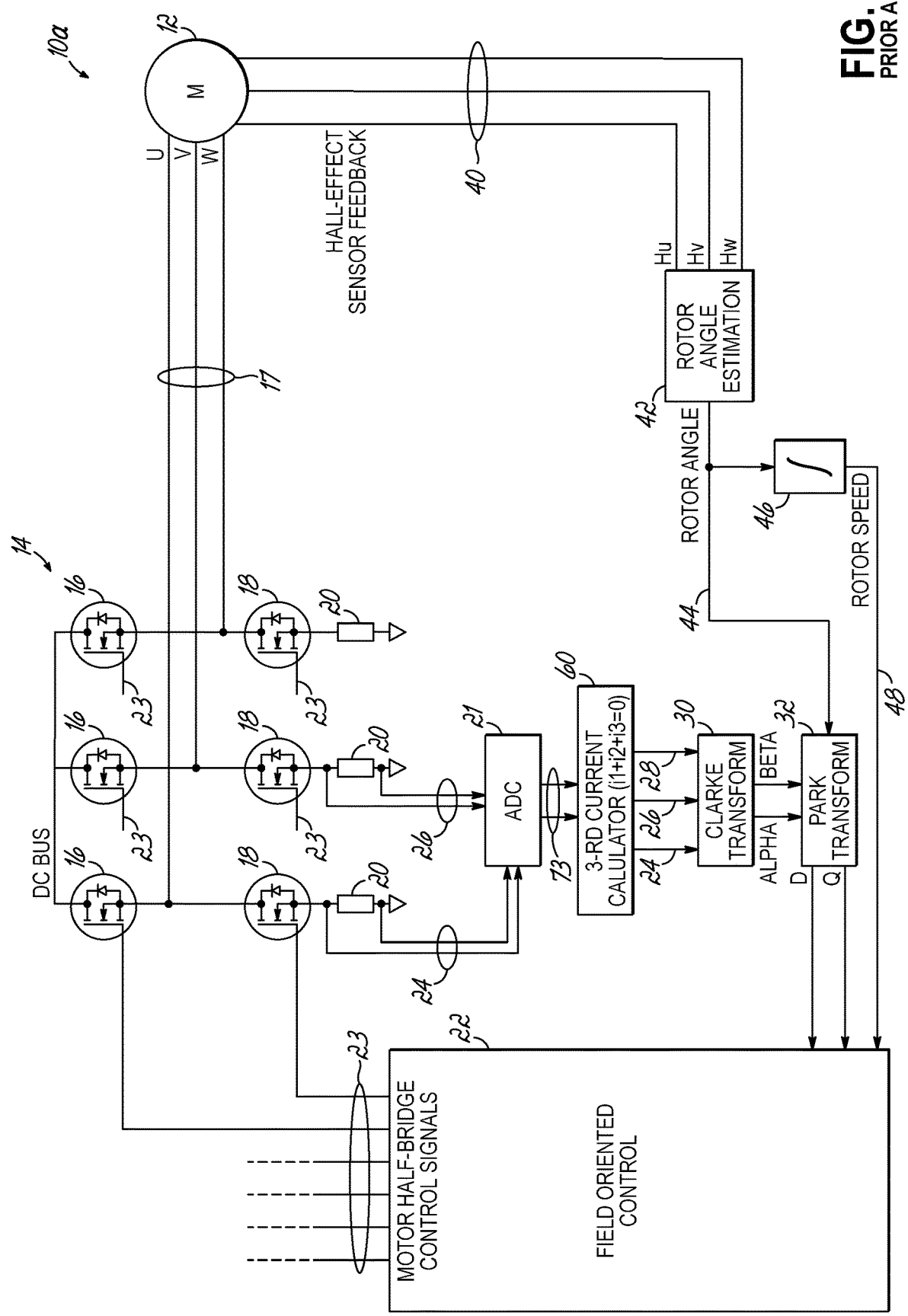
FIG. 3 is a circuit diagram of an alternative motor control circuit system that provides a conventional measurement of motor currents through two coils of a motor with the calculation of a third signal for use in the control scheme.

FIG. 3 illustrates a system 10a, somewhat similar to that of FIG. 1 that shows another conventional motor control scheme as noted above, wherein like reference numerals are used for like elements. The system of FIG. 3 provides for the measurement of only two coil currents. The third current signal value is then calculated. For example, FIG. 3 shows a system 10a wherein the current measurements are made for the coils driven by the U and V phase signals and those measured currents are provided to a circuit 60 that uses the two signals 24 and 26 in order to calculate a third current measurement 28. The same two transistors area measured each time. The signals are then provided to transformation circuitry 30, 32 as discussed and used to provide control of the motor 12 through control circuit 22.

Figure 4:
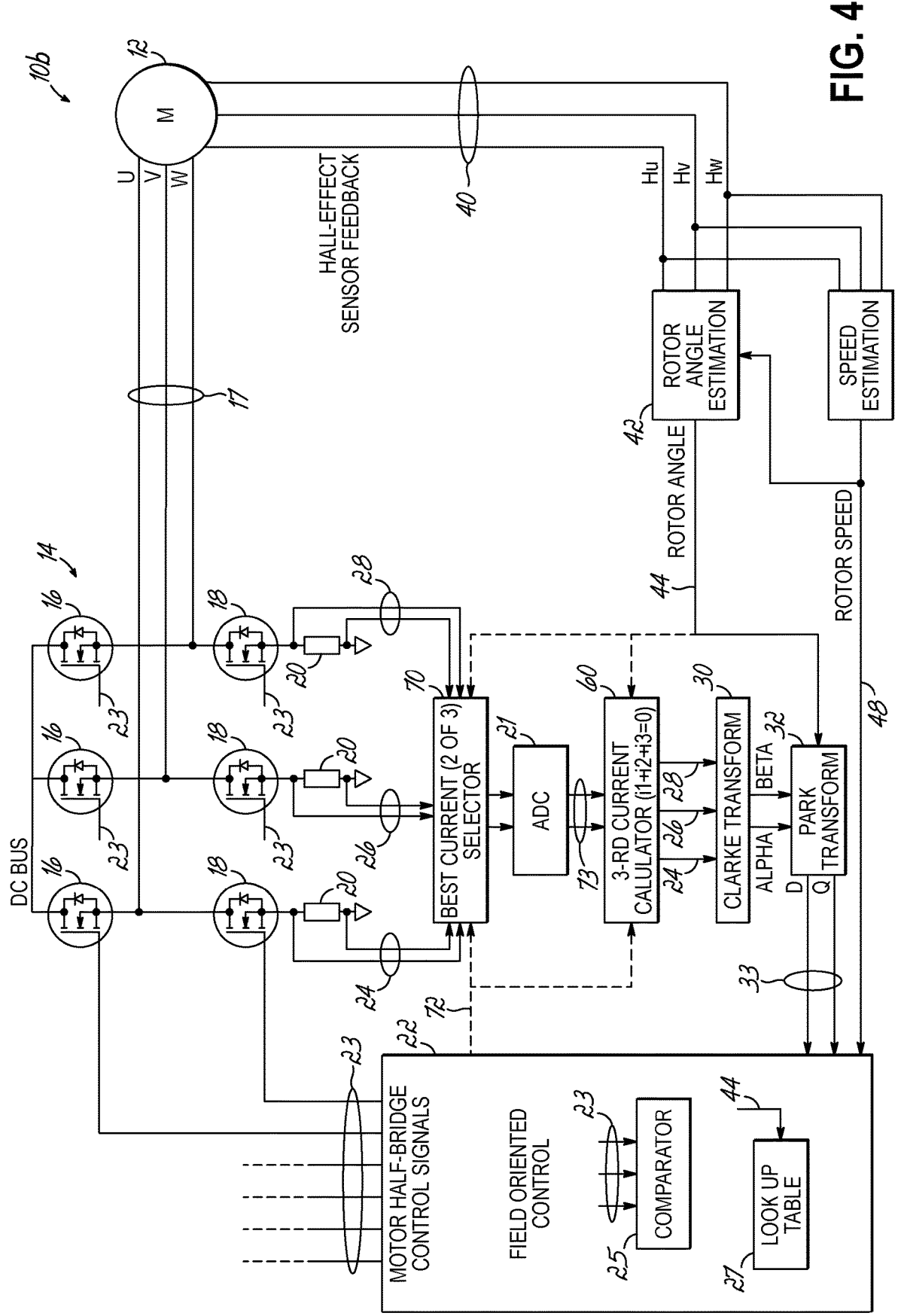
FIG. 4 is a circuit diagram of a motor control circuit system in accordance with an embodiment of the invention that provides a selective measurement of motor currents through two dynamically selected coils of a motor for use in the control scheme.

FIG. 4 illustrates a motor control scheme and system 10b in accordance with one embodiment of the invention. Specifically, a selection circuit 70 is illustrated that dynamically evaluates and selects the specific coil current measurements that will be utilized in the control scheme to control the motor 12. Different measurements are dynamically selected over time. Common elements as shown in FIGS. 1 and 3 will use similar reference numerals as noted. The present invention provides an improvement on the scenario of having to always measure all three coil currents simultaneously and to have the necessary expensive and/or bulky components to handle such consecutive measurements. The present invention further improves on the degradation of control that is provided on only measuring the same two coil currents while also having to limit the full PWM of the motor driver circuit to achieve proper measurements.

The present invention dynamically selects which measured motor currents should be used based upon an evaluation of the various motor drive conditions. In one embodiment, the control signals are evaluated to determine which actual current measurements are to be used and which current measurements are to be calculated for use by the control circuit 22. Specifically, in one embodiment, the PWM values for the control signals 23 for the three phase channels of the motor control are evaluated against each other. Based upon the level of those three PWM values, the circuit 70 selects two of the available coil current measurements that will provide the longest measurement window and the best measurements and ignores the measurement that has the shortest window and is least reliable. The invention then uses the two best dynamically selected current measurements to compute the less reliable third current measurement. The selection circuit 70 uses the motor drive control parameters and the PWM information as input data 72 and dynamically selects the best two current measurements of the three current measurements. From the selection circuit 70, the two dynamically selected current measurements 73 associated with those selected phase channels are directed to an ADC and then are provided to the calculation circuitry 60 for calculating the third current signal, such as using Kirchoff's law. The ADC only has to handle the two channels as illustrated which allows the use of less expensive signal processing elements. In the illustrated embodiment, the current selection circuit 70 makes a dynamic decision as the motor is operating as to which two phase current signals will be used for motor control. The selection is made by examining the three PWM values for the phase signals that will be sent to the individual legs and transistors of the drive circuit 14 through control circuit 22. The measurement for the phase control signal that would be reflective of the shortest measurement window for measuring the current for that phase current drive signal 17 is then excluded from being used in the control loop. The selected current measurements for the other selected phase channels are then used, and the third coil current (that was discarded) is calculated using the other selected current measurements for the selected phases. The cycle dynamically repeats, and the motor is controlled while using the best current measurements that are available.

Depending on when the drive current values are measured, different phase measurement values will be discarded and then calculated. Also, depending on where the coil drive currents are measured or how they are measured in the motor drive circuit 14, the control signal parameter that is to be used for the decision on the dynamic selection my vary. For example, depending on if the current measurements are made in the section of drive circuit 14 having the bottom transistors or the section with top transistors, the phase channel having the highest or the lowest PWM signal, reflected by data from the control circuit 22, might indicate which channel will have the smallest measurement window and should be discarded and calculated. For example, in the illustrated embodiment of FIG. 4, the currents reflecting the drive current signals 17 are measured across the shunt resistors 20 at the branches for the bottom transistors 18. Therefore, in that scenario, the phase or leg that has the highest PWM value phase signal from the control circuit 22 (reflective of the PMW for the top transistors 16) will be reflective of the shortest ON time for the bottom transistors 18 for that leg. Therefore, the current high PMW channel at a time of the measurements will be the channel that exhibits the detrimental settling time issues as illustrated in FIG. 2 for the bottom transistors. The short measurement window with the least reliable measurement is dynamically and selectively discarded by the invention at that cycle of the motor operation. As such, the discarded current measurement will vary in accordance with one feature of the invention. In that way, only the best and most reliable current measurements are used and the discarded measurement would be calculated.

Figure 4A:
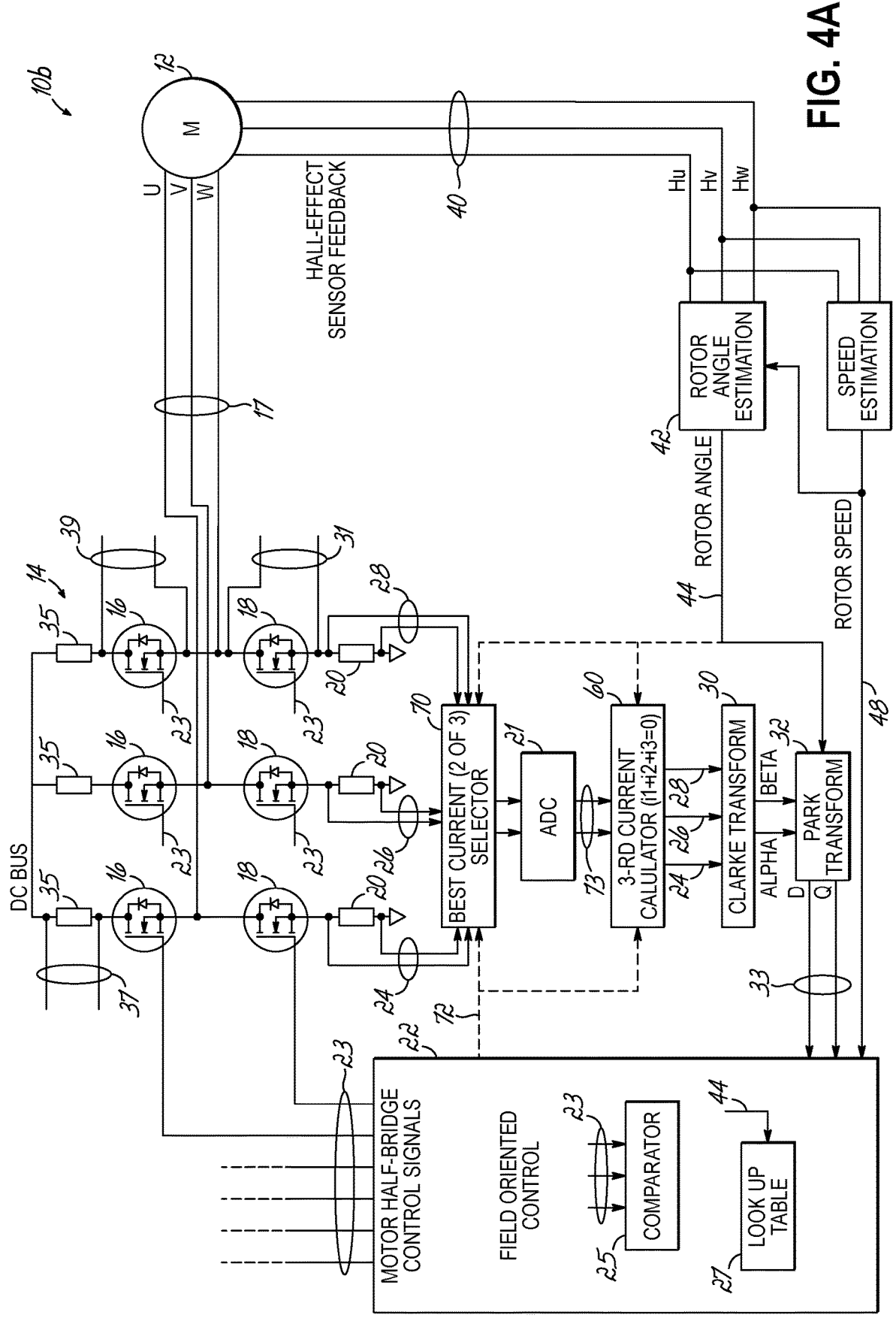
FIG. 4A is a circuit diagram of a motor control circuit system in accordance with another embodiment of the invention that provides a selective measurement of motor currents with other measurement schemes.

The channel current measurement that is selected to be discarded (the shortest measurement window) may be indicated by different values of the control signals 23 based on where the current signals are measured. FIG. 4A illustrates additional measurement positions for determining the drive currents or coil currents for the different phase channels. For example, as shown, the current drive signals for the various phases might be measured with the bottom transistors conducting and might be measured using measurements across shunt resistors 20, as illustrated. Alternatively, the current might be measured across the bottom transistors 18 using the resistance, such as the Rds_ON resistance, of the transistors 18. For such a measurement, the measurements 31 are made across the transistors. In the use of the Rds_ON resistance and measurements 31 across the transistors, the need for discrete shunt resistors 20 is removed.

In a further alternative, as shown in FIG. 4A, measurements might be made in the branches associated with the top transistors 16. For example, shunt resistors 35 might be used to take measurements 37 for determining coil currents based on top transistor conductive conditions. Or the resistance, such as the Rds_ON resistance, of the transistors 16 used in the top section of the drive circuit 14 may be used so that measurements 39 are made across the transistor. In such measurement scenarios using the top transistors, the higher PMW would actually indicate a long ON time for a phase or leg and a large measurement window. Therefore, the shorter measurement window and measured value to be discarded would be associated with the phase having the lower PMW signal for a particular phase control signal. Therefore, depending on where the current values are obtained to reflect the coil currents, different control signal conditions might be used to dynamically discard certain measurements and select the best and most reliable measurements through selection circuit 70.

The explanation of the inventive process as set forth herein referring to the use of shunts or the particular placement of those shunts is therefore not limiting to the current invention. Also, a PWM value or other control signal parameters indicative of a short measurement window for the phase current measurement are used for the dynamic selection purposes. As noted, whether that selection is based on a high PMW value or a low PWM value depends on where and how the coil current values are measured. In each embodiment, the excluded channel or phase and respective excluded measured current would be the phase that is indicative of the shortest measurement window and least reliable measurement in the phase current measurement.

Figure 5:
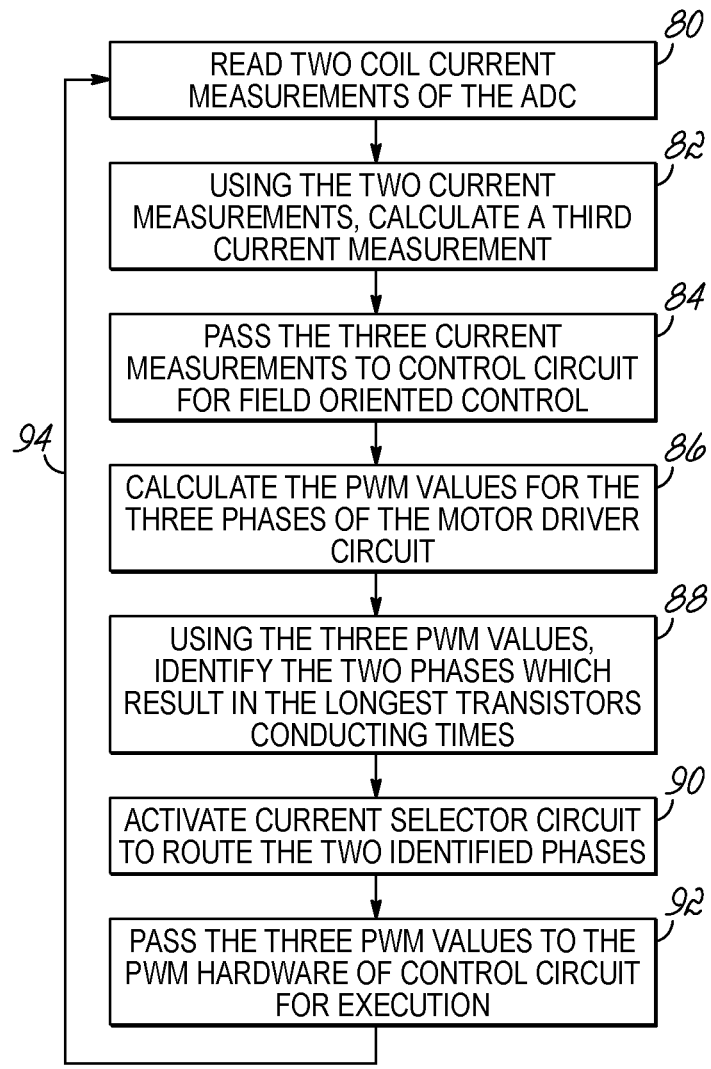
FIG. 5 is a flow diagram of the operation of an embodiment of the present invention.

FIGS. 4 and 5 illustrate an embodiment of the invention and the flow of control of the software of the control system 10b of the embodiment of the invention as illustrated in the Figures. The terms "control circuitry" or "control system" is used herein to describe the circuitry used to control the operation of the motor 12, including the field oriented control circuit 22, the transformation circuitry 30, 32, the current selection circuitry 70, ADC 21 and the current calculator circuitry 60, as well as other elements such as the rotor angle estimation circuitry 42 and rotor speed estimation circuitry 46, for example. Various of the noted functions may be found in the field oriented control circuit 22. Accordingly, the invention is not limited to a specific layout or arrangement of the circuitry element of the control system and the different functional components may take different forms without deviating from the invention.

Referring to FIG. 5, in every cycle of the control system 10b and control circuitry 22, and particularly every cycle of the motor driver portion of the circuitry 22, the process and flow as shown is executed. Specifically, the two dynamically selected coil current measurements are read from the ADC circuit 21 (step 80). The two selected coil current measurements are determined as described herein. The analog-to-digital (ADC) circuitry 21 that processes the measured coil current values from measurements 24, 26, 28 is shown as a separate block. But the A/D functionality and conversion circuitry to reflect measured current may be implemented in the current selection circuitry 70 of the invention and the measured current values from the ADC may be selected as described.

The current selection circuitry 70 receives dynamic inputs 72 from the field oriented control circuit 22 for providing the dynamic selection function, as shown in FIG. 4. Based on the PWM control signals 23 to be directed to the motor drive circuit 14, the current selection circuitry 70 will have dynamically selected which measured current values will be excluded or discarded and therefore which measured current values will be used to calculate the third or other discarded value. Using the selected best two of the three current measurements from the ADC 21, the current calculator circuitry 60 calculates the third current "measurement" to be used for motor control (step 82) The three measured and calculated current values 24, 26, 28 are further processed and transformed, such as by circuits 30, 32 and are provided to the field oriented control circuitry 22 as inputs 33 for use in the control of the motor 12 (step 84).

In that motor control, the field oriented control circuit 22 calculates the necessary PMW control signals 23 to drive the coils of the three phase channels. The circuit 22 provides, for example, PMW control signals 23 that are output as the various channels or phases U, V, W for driving the transistors 16, 18 of the drive circuit 14 for driving the motor. (Step 86) The PMW values may be calculated in a number of different ways, such as using a Space Vector PWM calculation, or a sinusoidal PWM calculation or a Six Step PWM calculation, for example. Therefore, the present invention is not limited to the type of PWM calculation used in the circuitry 22.

In accordance with one feature of the invention, the field oriented control circuit 22 evaluates the three values of the PMW control signals 23 that are output for the various channels or phases U, V, W for making the dynamic current measurement selection. For example, comparator circuitry 25 might be implemented in the control circuit 22 for evaluating the various PWM values 23 for each channel and determining the measured current value or channel that is to be excluded for use in the motor control. As noted above, depending on where the current value is measured (top or bottom transistor paths or elsewhere), the comparator may seek to exclude the highest PMW channel signal or the lowest PMW channel signal. Specifically, the control circuit 22 evaluates the various channel signals to be used to select the two channels wherein the measurement window is wide enough (longest transistor conducting times) for accurate current measurements and to exclude the channel with the narrowest measurement window (shortest transistor conducting time). As may be appreciated, the PMW control signals will vary based upon the rotation of the motor and the angle and position of the rotor. The dynamically selected two channels are then identified as the two best channels for use of the associated measured current values in the motor control. (Step 88). Data 72 that indicates or is associated with the two best channels is provided to both the current selection circuitry 70 and the current calculator as control data to control the selection of the two best measured channel current values for use in the current calculation to then calculate the current "measurement" for the excluded current value. (Step 90.) As noted in Step 82, current calculator circuitry 60 uses the output two best channel current measurement values 73 and calculates the third current value to replace the excluded signal value in accordance with the invention. Those three current values (two selected values and third calculated value) are used by circuits 30, 32 and then ultimately by control circuit 22 for generating PWM values. The three PWM values, that were used for the evaluation and selection, are passed to the PWM hardware of the field oriented control circuit 22 and drive circuit 14 for execution and motor control. (Step 92.) With the cycle now complete, the loop path 94 indicates that the next time the control circuitry passes through Step 80 for reading the two coil current measurements of the ADC, the invention will have measured the desired current for the "2 best channels" indicated by the evaluated PWM signals and ignored the potentially noisy and inaccurate third channel current measurement and those best channel measurements may be used as in Step 80 to repeat the cycle.

Figure 6:
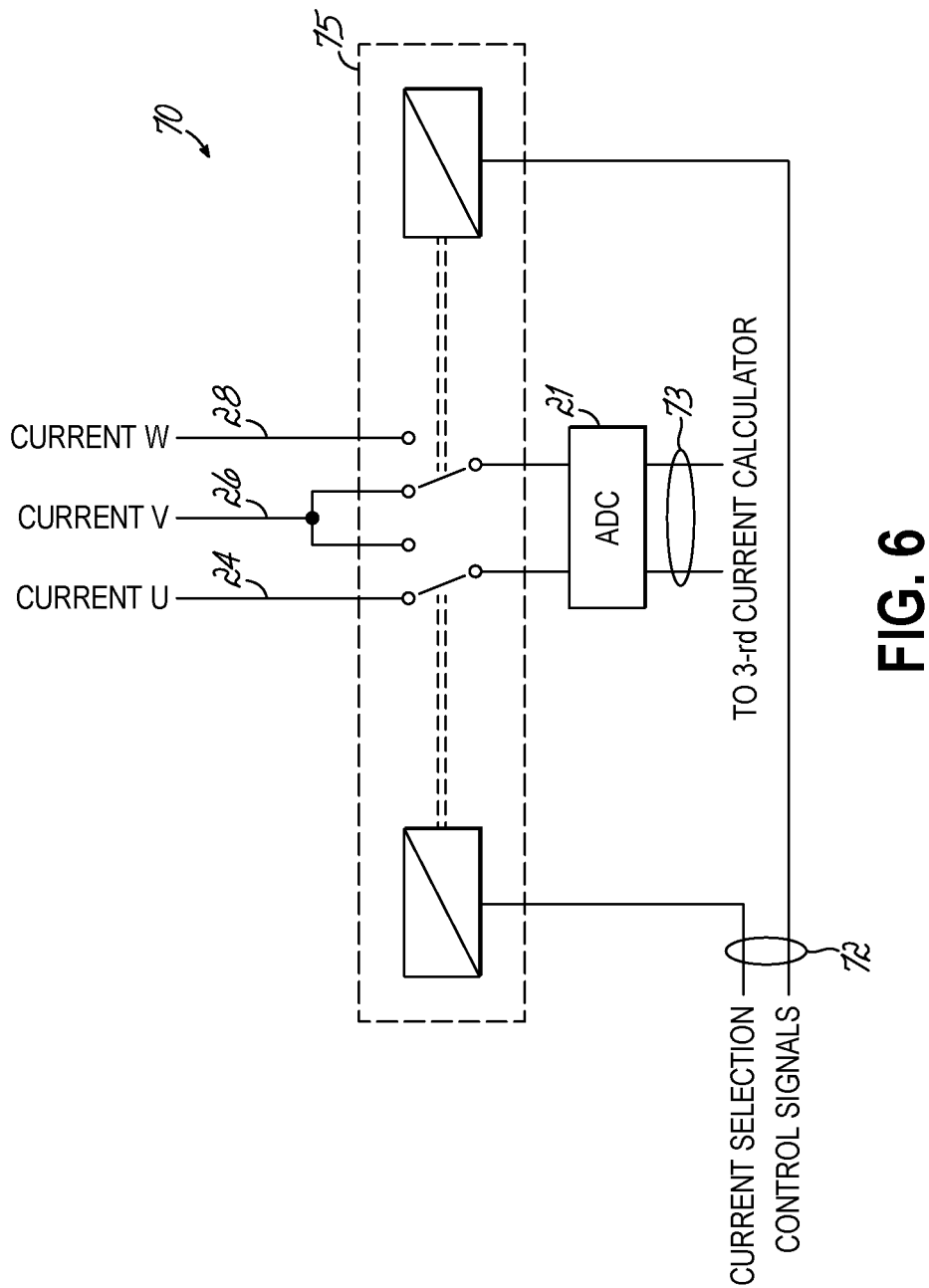
FIG. 6 is a circuit diagram of selection circuitry for dynamically selecting the current of coils of a motor for use in the control scheme in accordance with the embodiment of the invention in FIG. 4.

FIG. 6 illustrates exemplary current selection circuitry 70 for use in the invention. Measured phase currents 24, 26, 28 for the U, V, and W phase channels are directed to a switching or multiplexing circuit 75 that receives control signals 72 for the dynamic selection of the desirable current values that are measured for the determined two best channels. In accordance with one disclosed embodiment as illustrated in the Figures, the two best or desirable channels are selected based upon the use of the PWM values and the determination of those channels that indicate the longest conduction times and thus longest measurement windows for measuring current. The digitized outputs 73 of the two best channel current values from the current selection circuitry 70 are then directed to the current calculator circuitry 60 for providing all three current values for use in providing further motor control through control circuit 22 as described herein.

In accordance with other embodiments of the invention, the evaluation of the best channels might be accomplished using other information rather than the PMW values. For example, position data associated with the rotor might be used. Specifically, the selection might be based on other such data, such as data coming from:

Hall-effect sensors—for determining the rotor angle
Absolute encoder—for giving the rotor angle
Incremental encoder—for giving the rotor angle
Resolver—for giving the rotor angle
Sensorless state observer—for giving the rotor angle
Sensorless BEMF monitor/observer—for giving the rotor angle The position data, such as rotor angle 44 may be used by control circuit 22, such as with a look up table 27, to identify the particular time in the motion of the motor where the half-bridge transistors or switches will have the shortest ON time or conduction time for certain of the lower switches/transistors. The rotor angle thus may be used for generating the control signals 72 to the selection circuitry 70. In that way, rotor angle might be used as a criteria for dynamically selecting the best channels and excluding one or more of the worst channels that would yield a short measurement window and questionable current data. As noted, the worst or most unreliable value can be excluded from the measurement and instead calculated. The control circuit 22 would then take into account the rotor angle for providing the control signals 72 to selection circuitry 70 to dynamically select the best current measurements for use to calculate a third signal The control circuit has sufficient processing circuitry for evaluating the control signals, such as PWM signals, or evaluating other motor conditions, such as rotor angle position, to provide the necessary control signals 72 to the selection circuitry 70 to select and exclude certain current measurements to provide improved motor control.

The present invention provides a number of benefits with respect to prior art solutions. First, the invention uses relatively inexpensive current sensing resistors instead of expensive current transducers or transformers. In some embodiments, resistors are even eliminated by measuring the voltage drop across the upper or lower transistor and using the ON-Resistance of the transistor to calculate the current in that phase. The invention further uses ADC hardware that samples just 2 signals concurrently. Since the invention only measures the "2 best channels", in one embodiment, the invention measures the 2 signals in consecutive manner with minimal degradation of accuracy. Using an algorithm that operates using consecutive measurements instead of requiring concurrent measurements ensures that the ADC requirement is relaxed even more, thus allowing less expensive ADC hardware to be used. The PWM output capability for each of the channels is 0-100% because even at 100% PMW, (when essentially the lower transistor never conducts), the control circuitry of the invention adaptively selects the other two channels for current measurement and recreates the missing or unmeasured channel in software.

A person having ordinary skill in the art will recognize that other alternative hardware and/or software environments may be used without departing from the scope of the invention. Additionally, a person having ordinary skill in the art will appreciate that the various devices or control circuits and/or system controllers or computing systems may include more or fewer applications configured therein. As such, other alternative hardware and software environments may be used without departing from the scope of embodiments of the invention.

The routines executed to implement the embodiments of the invention, such as in the control circuit 22 whether implemented as part of an operating system or a specific application, component, program, object, module or sequence of instructions executed by one or more devices/controllers and/or control systems/computing systems will be referred to herein as a "sequence of operations," a "program product," or, more simply, "program code." The program code typically comprises one or more instructions that are resident at various times in various memory and storage devices in a controller and/or computing system, and that, when read and executed by controllers and/or a computing system, cause that controller and/or computing system to perform the steps necessary to execute steps, elements, and/or blocks embodying the various aspects of the invention. The control circuit has sufficient processing circuitry for evaluating the control signals, such as PWM signals, or evaluating other motor conditions, such as rotor angle position, to provide the necessary control signals 72 to the selection circuitry 70 to select and exclude certain current measurements to provide improved motor control.

What is claimed is:

1. A motor control system for controlling a motor having multiple coils, the control system comprising:
   a motor control circuit for providing a plurality of control signals for controlling a motor;

a motor drive circuit, coupled to receive the control signals and configured for providing current drive signals to the multiple coils of the motor;

circuitry for measuring a plurality of signal values reflective of the level of the current drive signals to the multiple coils of the motor;

selection circuitry configured to evaluate the plurality of control signals with respect to each other and based on the evaluation to dynamically select certain signal values from the measured plurality of signal values to use for calculation and to exclude at least one signal value from the measured plurality of signal values;

calculation circuitry configured to use the dynamically selected signal values to calculate a value for the at least one excluded signal value;

the motor control circuit using the measured and calculated signal values for providing the control signals for a motor.

2. The motor control system of claim 1 wherein the motor control circuit provides a plurality of PWM control signals controlling a motor, the PWM selection circuitry configured for evaluating the PWM control signals with respect to each other and dynamically selecting signal values based upon evaluation of the PWM control signals.

3. The motor control system of claim 2 wherein the selection circuitry is configured to exclude the at least one signal value based on at least one of the highest PWM level control signal or the lowest PWM level control signal of the plurality of PWM control signals.

4. The motor control system of claim 1 wherein the motor drive circuit includes a plurality of transistors for turning ON and OFF for providing the current drive signals to the multiple coils of the motor, the circuitry for measuring a plurality of signal values being configured for measuring values reflecting the level of current passing through transistors turned ON.

5. The motor control system of claim 4 wherein control signals indicate a length of time that the transistors will be turned ON and provide current drive signals, the selection circuitry configured to dynamically exclude at least one signal value for a transistor that is turned ON the shortest length of time.

6. The motor control system of claim 1 further comprising a circuit for determining an angle of a rotor of the motor being controlled, the dynamic selection of certain signal values from the measured plurality of signals being further based upon evaluation of the angle of the rotor.

7. The motor control system of claim 1 wherein the motor control circuit includes a field oriented control circuit.

8. The motor control system of claim 1 wherein the motor drive circuit includes a half-bridge circuit having a plurality of transistors.

9. A method of motor control system for controlling a motor having multiple coils, the method comprising:
providing control signals for controlling a motor;
providing current drive signals to the multiple coils of the motor;
measuring a plurality of signal values reflective of the level of the current drive signals to the multiple coils of the motor;
evaluating control signals with respect to each other and dynamically selecting certain signal values from the measured plurality of signal values to use for calculation and excluding at least one signal value from the measured plurality of signal values;
using the dynamically selected signal values to calculate a value for the at least one excluded signal value;
using the measured and calculated signal values for providing the control signals for a motor.

10. The method of claim 9 further comprising providing a PWM plurality of PWM control signals for controlling a motor and evaluating the PWM control signals with respect to each other and dynamically selecting signal values based upon evaluation of the PWM control signals.

11. The method of claim 10 further comprising excluding the at least one signal value based on a PWM control signal providing at least one of the highest PWM level signal or the lowest PWM level signal of the plurality of PWM signals.

12. The method of claim 9 further comprising providing current drive signals to the multiple coils of the motor with a plurality of transistors that turn ON and OFF and measuring signal values reflecting the level of current passing through transistors turned ON.

13. The method of claim 12 further comprising dynamically excluding at least one signal value for a transistor that is turned ON the shortest length of time of the plurality of transistors.

14. The method of claim 9 further comprising determining an angle of a rotor of the motor being controlled, and dynamically selecting certain signal values from the measured plurality of signals based also upon evaluation of the angle of the rotor.

15. The method of claim 9 further comprising providing control signals for controlling a motor with a field oriented control circuit.

16. The method of claim 9 further comprising providing current drive signals to the multiple coils of the motor with a half-bridge circuit having a plurality of transistors.

* * * * *